United States Patent [19]

Potter et al.

[11] 4,021,619

[45] May 3, 1977

[54] IMPROVED DIGITAL TELEPHONE AND SWITCHING SYSTEM EMPLOYING TIME DIVISION MULTIPLEX PULSE CODE MODULATION

[75] Inventors: Arthur Robin Potter, Samundham; Donald William Smith, Ipswich, both of England

[73] Assignee: The Post Office, London, England

[22] Filed: June 3, 1975

[21] Appl. No.: 583,430

[30] Foreign Application Priority Data

June 10, 1974 United Kingdom ............ 25564/74
June 10, 1974 United Kingdom ............ 25565/74

[52] U.S. Cl. .................... 179/18 FC; 179/15 AT; 179/18 EA
[51] Int. Cl.² ............................................ H04Q 3/60
[58] Field of Search ..... 179/18 FC, 15 AT, 18 AD, 179/18 B, 18 BE, 18 EA

[56] References Cited
UNITED STATES PATENTS

| | | | |
|---|---|---|---|
| 3,311,705 | 3/1967 | Le Corre et al. ............ | 179/15 AT |
| 3,492,430 | 1/1970 | Vigliante ...................... | 179/15 AT |
| 3,544,728 | 12/1970 | Rodkin et al. ................ | 179/18 AD |
| 3,629,511 | 12/1971 | Wolf ............................ | 179/18 AD |
| 3,710,033 | 1/1973 | Whitney ...................... | 179/18 BE |
| 3,714,378 | 1/1973 | Kimura et al. .................. | 179/18 B |
| 3,778,555 | 12/1973 | Nordling et al. ............. | 179/18 FC |
| 3,854,013 | 12/1974 | Altenburger et al. ......... | 179/18 BE |
| 3,912,873 | 10/1975 | Skaperda .................... | 179/18 FC |
| R28,337 | 2/1975 | Singer ........................ | 179/18 ES |

FOREIGN PATENTS OR APPLICATIONS

| | | | |
|---|---|---|---|
| 14,968 | 9/1966 | Japan ........................... | 179/18 FC |
| 14,969 | 9/1966 | Japan ........................... | 179/18 FC |

Primary Examiner—Thomas W. Brown
Attorney, Agent, or Firm—Hall & Houghton

[57] ABSTRACT

A telephone system is disclosed in which local groups of customers each have a respective concentrator. The concentrators are connected to two main switching centers by pulse code modulation highways. Four highways from each of eight concentrators are shown and each highway from a concentrator is terminated on a different group control, there are two group controls in each main switching center. Each concentrator contains a line unit, a switching network, a signalling unit, auxiliary units, a pulse code modulation multiplexor and control logic. The line unit detects the customer calling condition; the switching network is a two stage analogue crosspoint switch connected from customers' lines to the signalling unit; the signalling unit provides an analogue/digital interface; the auxiliary units provide special facilities such as coin fee checking; the pulse code modulation multiplexor passes data to and from the main switching centers; and the control logic controls the operation of the concentrator in accordance with instructions received from a main switching center. The main switching centers instruct the concentrators on the allocation of pcm channels to customers and the interconnection of two customers is performed by an interconnection of channels within a switching center. The switching network of each concentrator is made up of a number of sections and information is sent on each highway as to which sections are being addressed on the other highways of the concentrator. The system includes an arrangement to avoid setting up the same connection at once on two highways.

8 Claims, 14 Drawing Figures

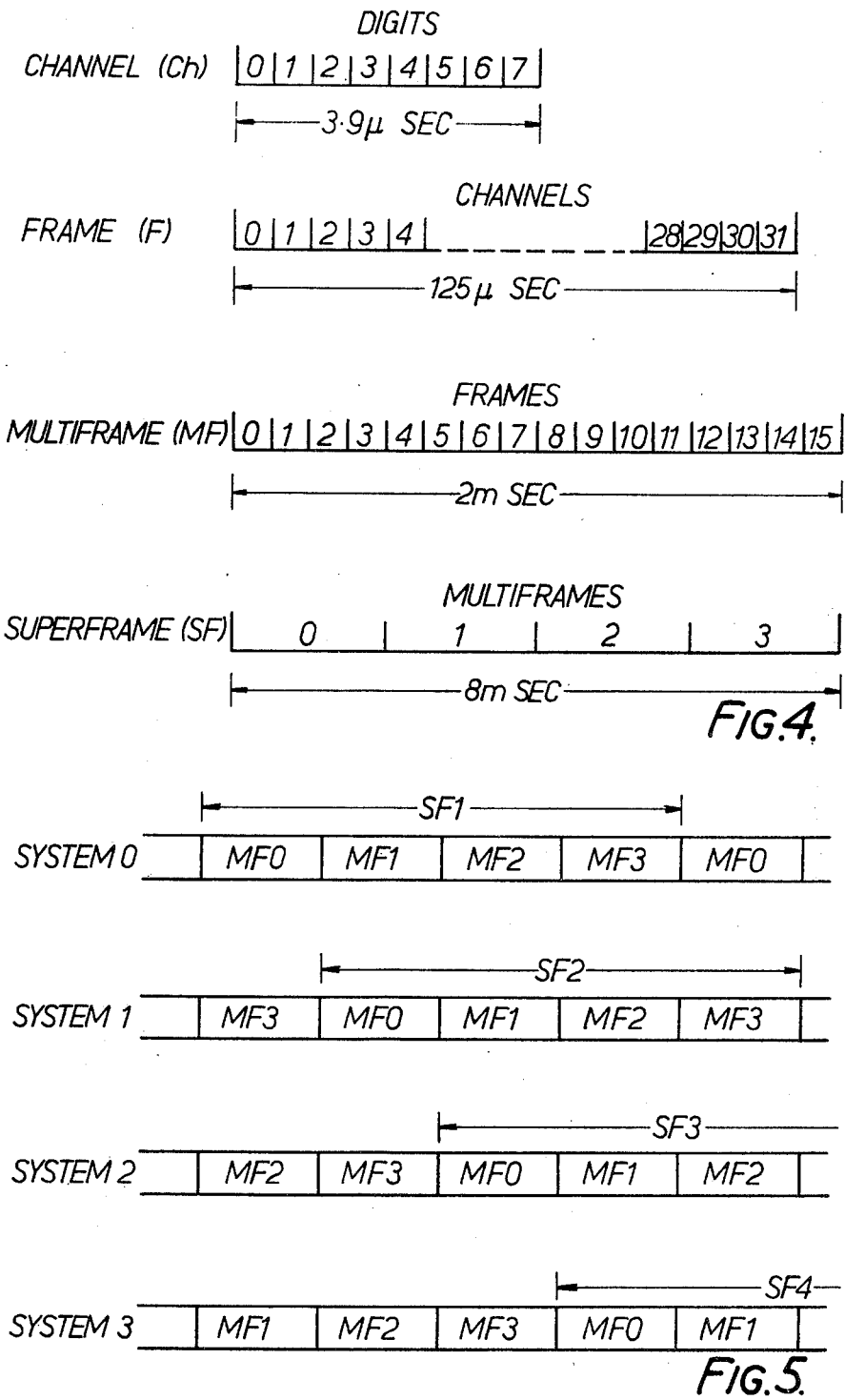

IMPROVED DIGITAL TELEPHONE AND SWITCHING SYSTEM EMPLOYING TIME DIVISION MULTIPLEX PULSE CODE MODULATION

This invention relates to improvements in digital switching systems and more particularly, but not exclusively, to telephone systems.

The telephone network existing in Britain at the present time is based on the use of local exchanges serving customers in a respective area and provided with analogue links to group switching centres. The topology of the existing network has been evolved around the use of Strowger switches and audio frequency junctions and has indeed proved very satisfactory for its purpose. When, however, digital techniques are considered it is found that an economy can be obtained by use of a different topology. Once speech has been converted into pulse code modulation (pcm) form the cost of transmission becomes very low compared with audio and it is thus more economic to collect traffic into large switching centres.

It is known that instead of each customer's line being directly connected to a main switching centre (which may involve a considerable distance) a number of customers within a relatively small area are connected to a concentrator situated within the area, whereby each line is of only a short length. The concentrator is connected to at least one main switching centre by a number of circuits less in number than the number of customers connected to the concentrator, the circuits being provided on the basis of the traffic requirements of the customers.

It is known to connect concentrators to main switching centres by means of time division multiplex circuits employing pulse code modulation. The economies to be gained by the use of pcm links must, however, be weighed against the cost of the concentrators. It is therefore most desirable that the concentrators should be as simple as possible and perform as few functions as possible.

In the prior art, the setting up of a call between customers has been accomplished by a switching centre instructing a concentrator that a certain incoming channel to it has an incoming call and it is to connect this incoming channel to a particular customer. This technique requires relatively complex switching facilities in the concentrator.

It is an object of the invention to provide a digital switching system in which a relatively simple concentrator can be used.

According to the invention, a digital switching system comprises a concentrator having a multiplicity of inputs for connection to data terminals and connected to a switching centre by a time division multiplex pulse code modulation (pcm) highway, the switching centre including concentrator control means operative to send to the concentrator a signal instructing the concentrator to connect a first data terminal to a particular pcm channel, and to connect a second data terminal to another particular pcm channel, and also including switching means operative to interconnect the particular pcm channels to thereby interconnect the two data terminals.

A plurality of concentrators can be provided and connected to common switching centre, the common switching centre being operative to instruct any concentrator to connect any data terminal connected to that concentrator to a particular pcm channel, and to interconnect pcm channels of different concentrators. A concentrator control means in a switching centre which is connected to control a group of concentrators is termed a "GROUP CONTROL" herein.

A plurality of concentrators can be provided and connected to two switching centres inter-connected by a control link, each switching centre being operative to instruct any concentrator to which it is connected to connect any data terminal connected to that concentrator to a particular pcm channel, and to interconnect pcm channels of different concentrators to which it is connected.

A plurality of concentrator control means can be provided in the or each switching centre each operative to instruct concentrator channel allocation.

A plurality of pcm highways can be connected from the or each concentrator to the or each switching centre.

Each concentrator control means can be connected to one highway from each concentrator.

The system can be a telephone system and the or each concentrator can comprise:
a line unit,
a switching network,
a signalling unit,
a pcm multiplexor, and
control logic operative to control the line unit, switching network, signalling unit and pcm multiplexor.

A plurality of auxiliary units can be provided in the or each concentrator, each operative to provide a special facility such as coin fee checking or howler.

The auxiliary units can each be associated with respective telephone lines.

The special facility can comprise coin fee checking, malicious call alarm or private metering.

The auxiliary units can be commonly available to all the telephone lines of the associated concentrator.

The special facility can comprise howler or line testing.

Some of the auxiliary units can each be associated with respective telephone lines and some can be commonly available to all the telephone lines of the associated concentrator.

The or each concentrator can comprise a number of sections each connected to a respective group of data terminals and means can be provided to transmit on each highway of the or each concentrator information as to which of its sections are being addressed on its other highway or highways and means can be provided in the or each switching centre to process this information and provide an output signal controlling which sections are to be addressed.

The invention also provides a method of setting up a connection between two data terminals in a digital switching system which comprises a multiplicity of data terminals connected to a concentrator, the concentrator being connected by a time division multiplex pulse code modulation highway to a switching centre, the method comprising: transmitting from said switching centre to said concentrator a signal instructing the concentrator to connect a first data terminal to a particular pcm channel, and to connect a second data terminal to another particular pcm channel, and interconnecting the particular pcm channels within the switching centre to thereby interconnect the two data terminals. A plurality of concentrators can be provided, and a signal can be transmitted to a first concentrator instructing that concentrator to connect a first data terminal to a particular pcm channel, a signal can be transmitted to a second concentrator instructing that concentrator to connect a second data terminal to a particular channel, and the two particular channels can be interconnected within the switching centre.

The digital switching system can be a telephone system and the method can comprise:

detecting a calling line at a concentrator and transmitting a signal to the switching centre indicating the detection of a calling line, transmitting a signal instructing the concentrator to connect the calling line to a particular pcm channel, connecting the calling line to the particular pcm channel within the concentrator, receiving at the switching centre information from the calling line as to the line to be called, transmitting a signal instructing the concentrator connected to the line to be called to connect the line to be called to a particular pcm channel, and interconnecting the particular pcm channels within the switching centre.

The method can include signalling from the switching centre to apparatus in a concentrator providing a special facility such as coin fee checking or howler.

The method can include transmitting a signal from a concentrator indicating that a special facility is required and transmitting a signal instructing the concentrator to connect the calling line to an auxiliary unit within the concentrator providing the special facility.

The method can include setting up connections independently on each of a plurality of highways connected from the or each concentrator to the switching centre.

The method can include setting up connections independently using two switching centres interconnected by a control link.

The or each concentrator can comprise a number of sections each connected to a respective group of data terminals, and there can be transmitted an each highway of the or each concentrator information as to which of its sections are being addressed on its other highway or highways, and this information can be processed in the or each switching centre to provide an output signal used to control which sections are to be addressed.

By way of example only, certain illustrative embodiments of the invention will now be described with reference to the accompanying drawings, in which.

Figure 6:
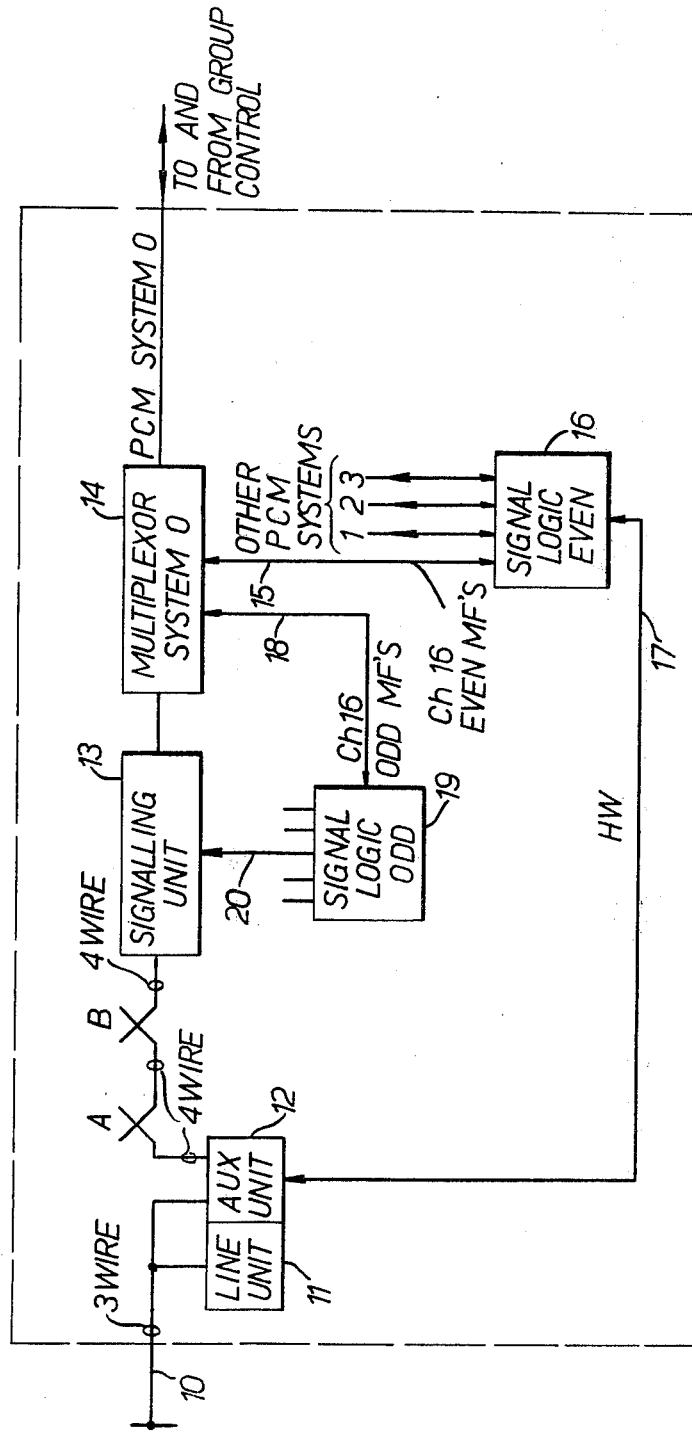
Figure 7:
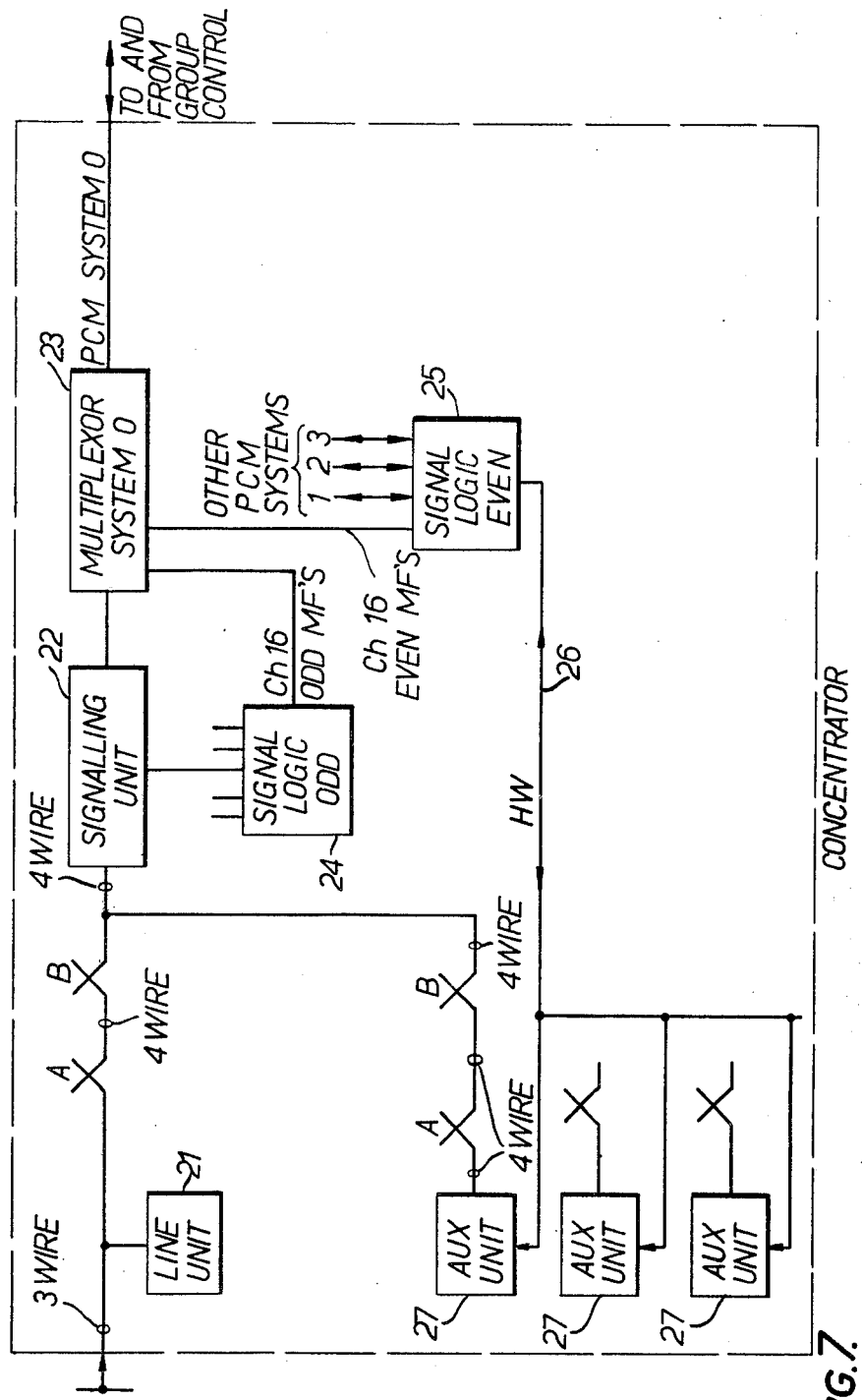
Figure 8:
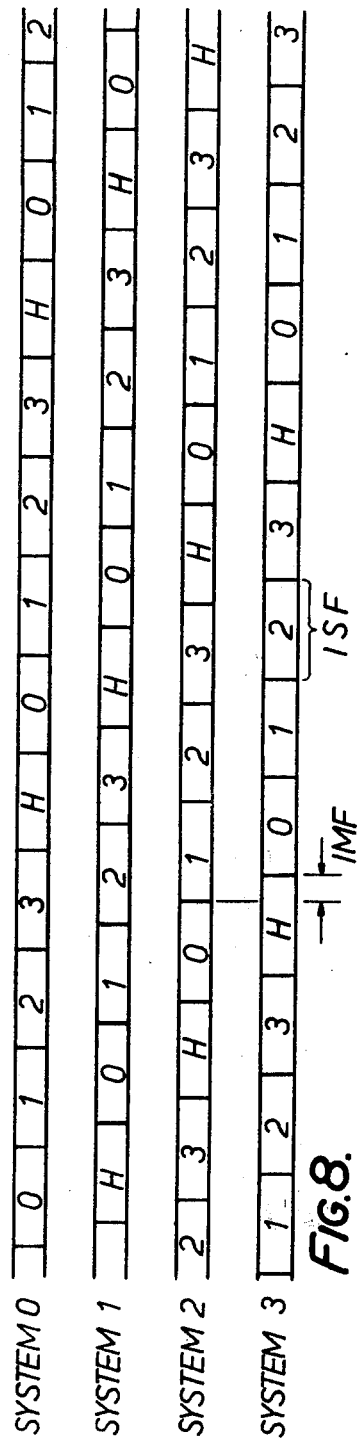
Figure 9:
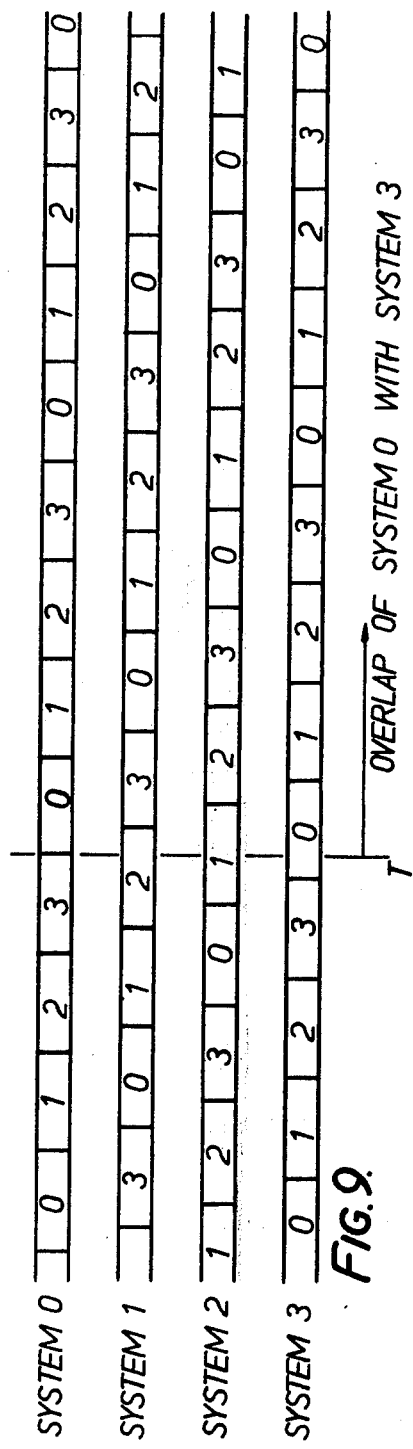
Figure 10:
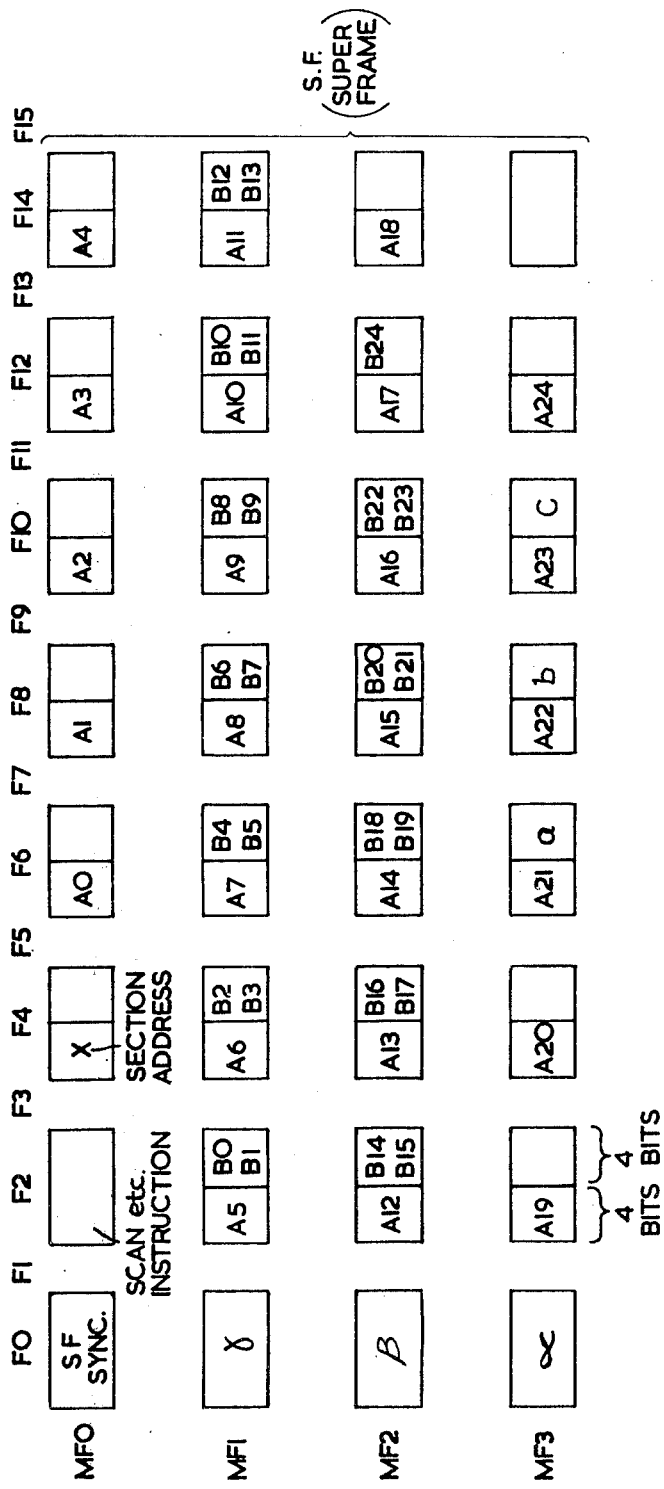
Figure 11:
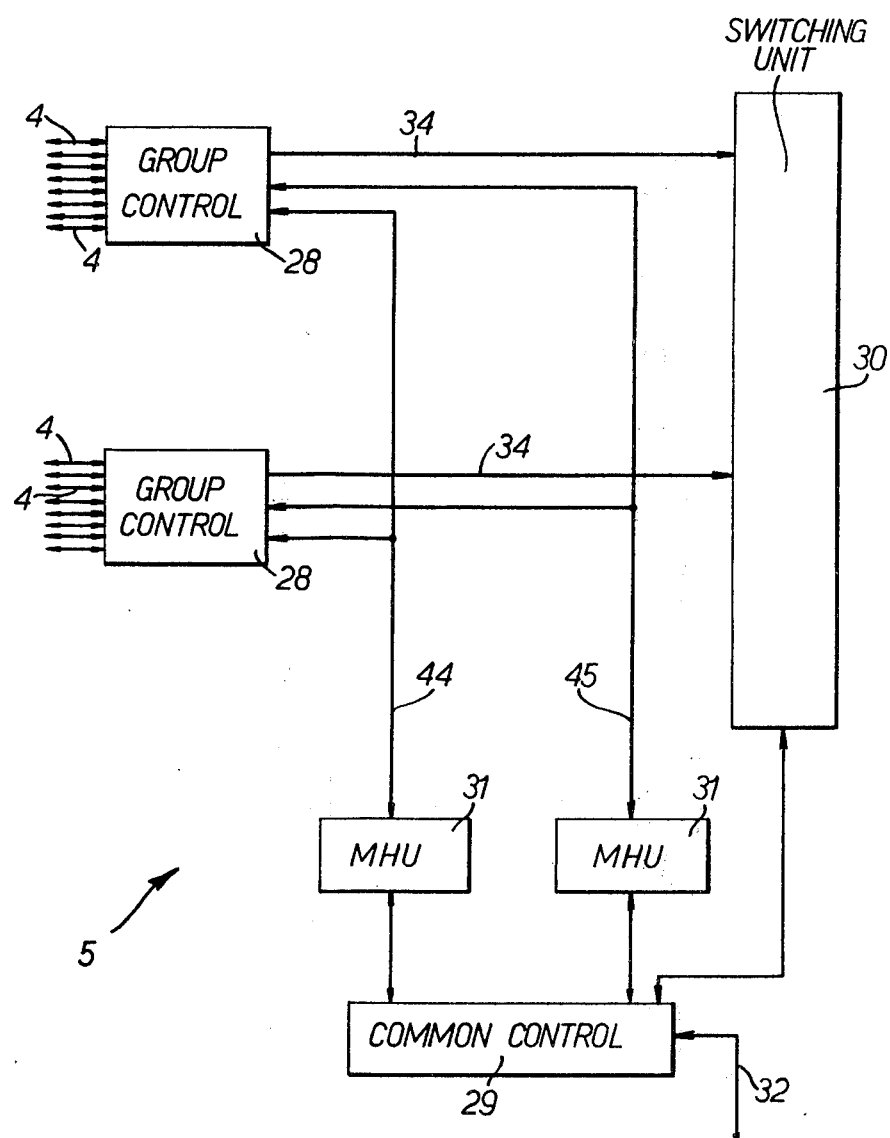
Figure 12:
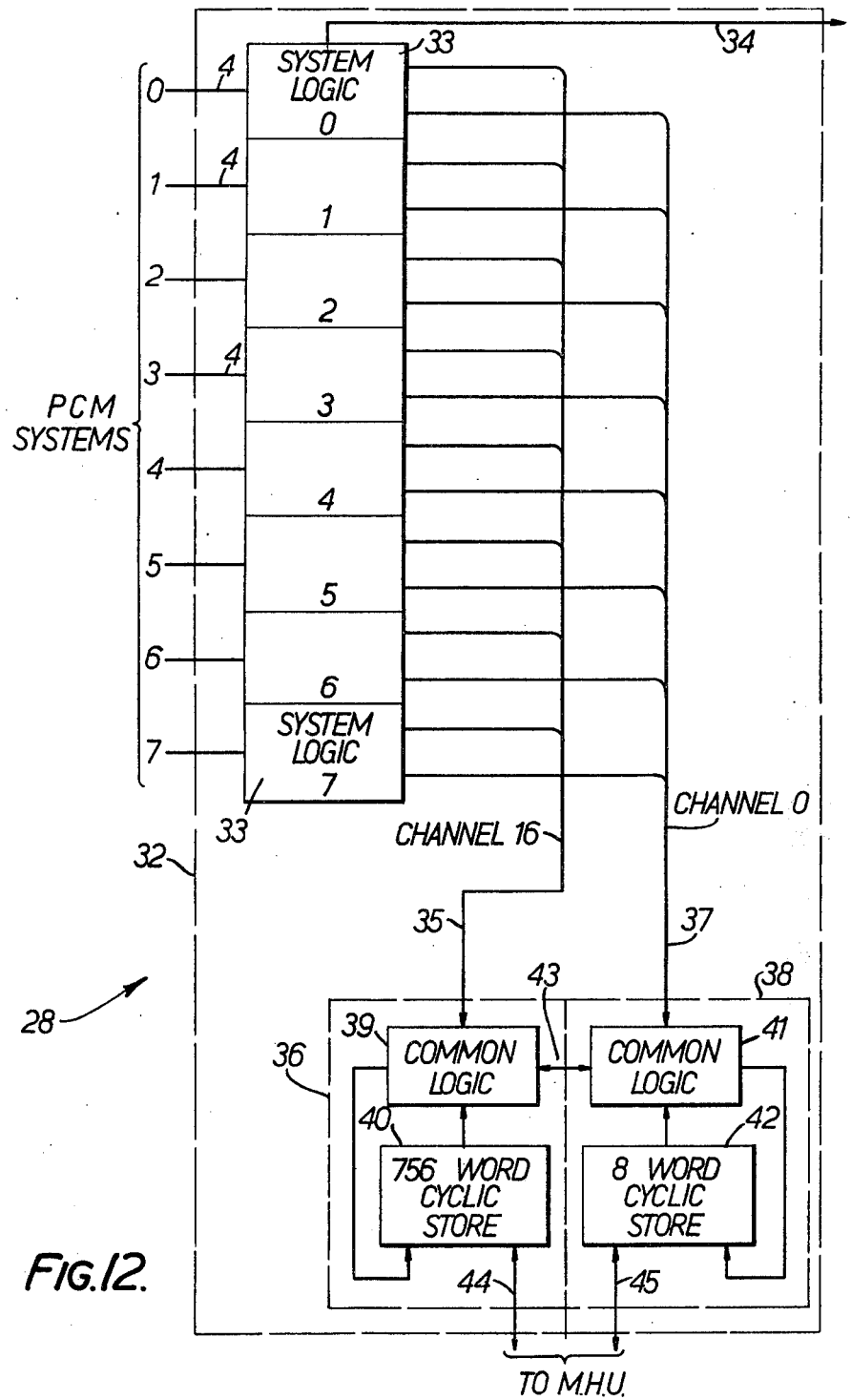
Figure 13:
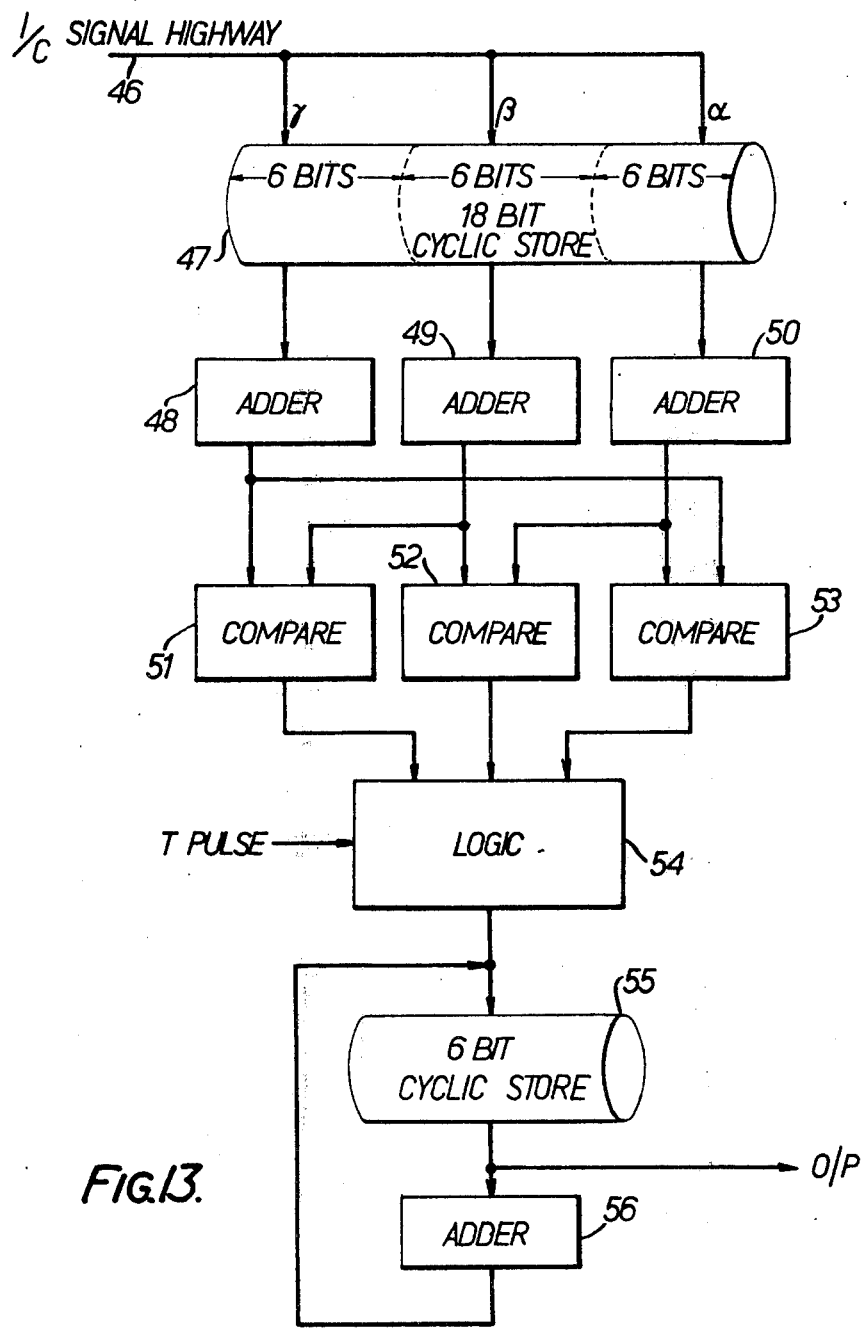
Figure 14:
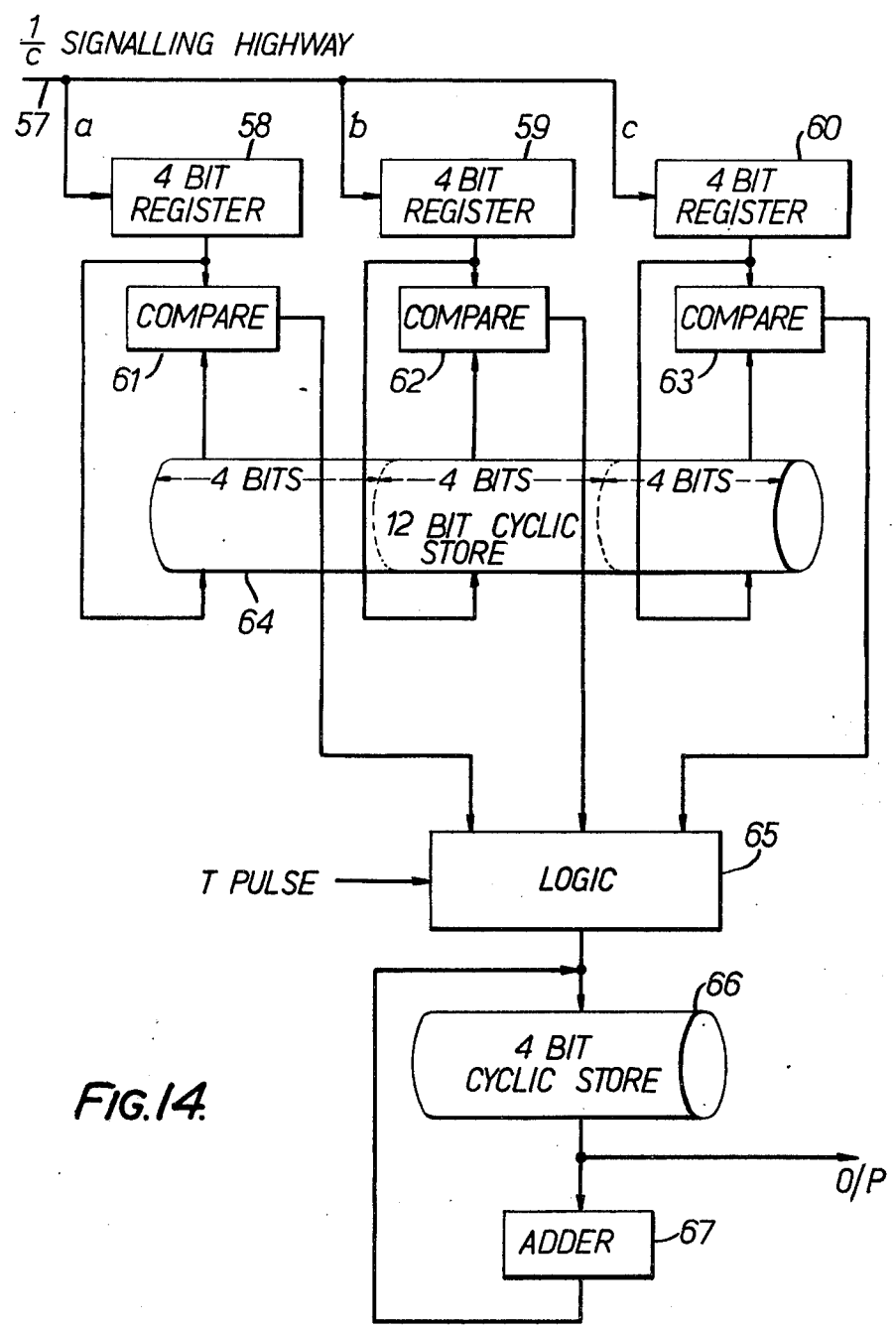

FIG. 4 shows the allocation of time in the time division multiplex systems used, FIG. 5 is a further illustration of time allocation, FIG. 6 is a more detailed schematic diagram of a concentrator, FIG. 7 is a more detailed schematic diagram of an alternative form of concentrator, FIGS. 8, 9 and 10 are further illustrations of time allocation, FIG. 11 shows an outline diagram of a main switching centre, FIG. 12 shows an outline diagram of one of several group controls used in a main switching centre, and FIGS. 13 and 14 show details of further circuits of a main switching centre.

Figures 1, 2:
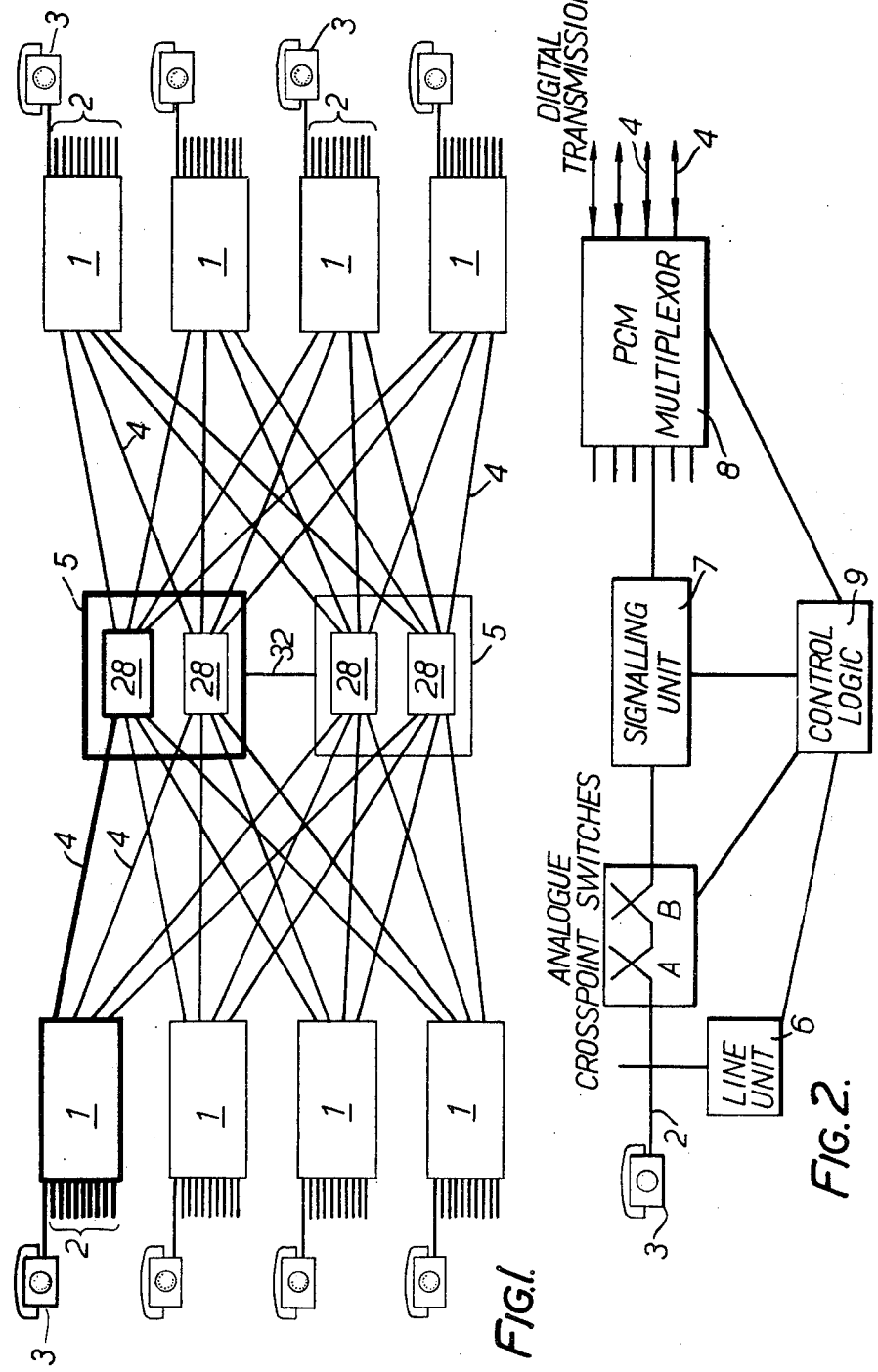
FIG. 1 shows an outline diagram of a telephone system embodying the invention.
FIG. 2 is an outline diagram of a concentrator used in the system.

FIG. 1 shows an outline diagram of a telephone system catering for twelve thousand customers. The twelve thousand customers are divided into eight local areas each having a locally positioned concentrator 1. The fifteen-hundred customers connected to each respective concentrator 1 are indicated diagrammatically by the lines 2 and telephone instruments 3. Each concentrator is connected by four highways to two switching centres 5, there being two highways from each concentrator to each of the two switching centres. Each switching centre 5 includes two group controls 28 and each group control 28 is connected to eight highways 4, all from different concentrators. The concentrators and switching centres operate in a time division multiplex mode using pulse code modulation. It should be noted that the switching centres contain other circuits besides the group controls but these other circuits are omitted from FIG. 1 for clarity.

To avoid presenting the reader with too many complexities at once, the small part of FIG. 1 marked in extra bold outline will be discussed first of all. This small part consists of fifteen hundred customers connected via one highway to one group control in a switching centre. Such an arrangement is not merely an aid to explanation but indeed could actually be put into practice if the need for a very simple system arises. The operation of this part will now be described in general terms. Supposing that customer X has lifted the handset of his telephone instrument to make a call, the concentrator will detect the calling condition on that customer's line and sends to the switching centre a message indicating that customer X is calling. The switching centre then sends back a message instructing the concentrator to connect customer X to channel M (say). The concentrator obeys this instruction and so connects the customer to the switching centre. The switching centre now sends dialling tone to the customer who responds by dialling the number of customer he wishes to call (customer Y, say). The switching centre responds to the dialled number by checking whether or not the called number is free. If customer Y is free the switching centre sends the concentrator instructions to connect customer Y to channel N, say. The concentrator obeys this instruction by making the channel N connection and ringing customer Y. At this stage, customer X is connected to the switching centre on channel M and customer Y is connected to the switching centre on channel N. The switching centre interconnects customers X and Y by connecting channel M to channel N.

This method of interconnecting two customers enables relatively simple equipment to be employed in the concentrator.

The working of the overall system of FIG. 1 is the same as the small part just discussed but it has much greater capabilities for handling calls. Each concentrator has four highways each connected to a respective group control and these group controls work independently in setting up connections. Connections can be set up between customers on different concentrators and not merely between customers on the same concentrator.

A block diagram of a concentrator 1 is shown in FIG. 2. The concentrator comprises a two-stage switching network A and B. Customers' lines 2 are connected as inputs to the A switch, each line having an individual LINE UNIT 6. The purpose of the LINE UNITS 6 is to detect the loop or calling condition on any customer's line and to signal the detection of the calling condition. After a path has been established through the switching network A and B the associated LINE UNIT is disconnected by a relay (not shown). The use and construction of LINE UNITS and switching networks A and B are familiar to those skilled in the art and do not require further description here.

The outputs of the B switch are connected to a SIGNALLING UNIT 7, in turn connected to a pcm MULTIPLEXOR 8. The SIGNALLING UNIT provides an analogue/digital interface in both directions between the customers and the pcm circuitry. It is capable of detecting the holding condition from a customer and can both ring and trip ringing. Those skilled in the art are familiar with the use of SIGNALLING UNITS and further description here is not necessary.

The MULTIPLEXOR 8 is a circuit of well known type and carries out time division multiplexing and de-multiplexing of pcm signals.

Operation within the concentrator is supervised by CONTROL LOGIC 9. The CONTROL LOGIC 9 takes incoming instructions from time-slot 16 in the pcm data, interprets them and routes them to an appropriate part of the concentrator, that is to the LINE UNIT, switching network or SIGNALLING UNIT or MULTIPLEXOR. It could, for example, take the form of Texas Instruments 7400 series logic elements.

The A switching networks are of the type described in U.S. Patent Specification No. 3,469,035.

Figure 3:
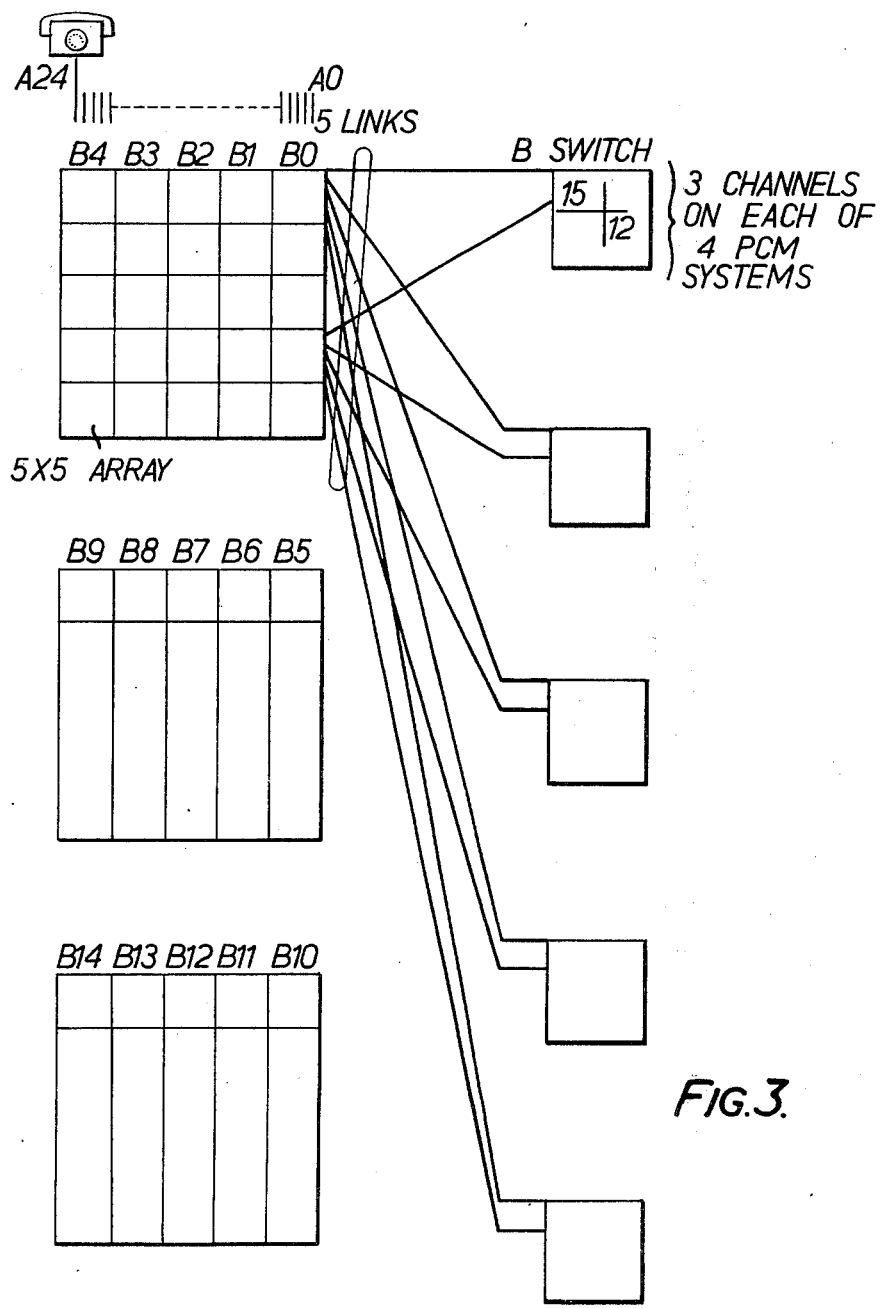
FIG. 3 is an outline diagram of switching arrangements in a concentrator.

The analogue switching networks A and B are built in separate sections so that the capacity of the concentrator can be expanded by the addition of one or more extra sections if the need arises. One such section is represented in FIG. 3, the total number of sections employed being four. The section comprises three A reed relay crosspoint switches and five B reed relay crosspoint switches interconnected by AB links as shown.

Each A switch consists of twenty-five 5 by 5 crosspoint arrays, which are commoned at the inlets in accordance with a slipped multiple wiring pattern. It should be understood that in considering the overall system directions are taken from the main switching centre out to the customers. Therefore, the pcm channels are described as connected to the B switch inlets and customers are connected to the A switch outlets.

Each A switch serves 25 AB links on its inlets, and 125 customers on its outlets. The twenty-five AB links are connected to the B switches such that each 5 by 5 A switch array has access to five different B switches.

Each B switch consists of five 6 × 5 crosspoint arrays, there being twelve inlets to each array. The twelve inlets of each array are connected to three channels on each of the four pcm highways. Each customer has access to fifteen circuits on each of the four pcm highways. The four sections of the concentrator are assembled with pairs of sections commoned at the B switch inlets: in this way a total of 1500 customers can be accommodated.

Information is transmitted on the pcm highways in frames comprising 32 channels, each channel comprising eight bits. The time division multiplexing has a nominal repetition rate of sixteen frames termed a multiframe. A group of four multiframes constitutes a superframe. The sampling rate is 8kHz giving an occupation time of 3.9 $\mu$S per channel, 125 $\mu$S per frame, 2mS per multiframe and 8mS per superframe. The relationship of the channels, frames etc. is shown diagrammatically in FIG. 4.

The pcm highways are required to transmit both the speech of customers (and also customers' non-speech data) and information and instructions for the internal control of the telephone system. The latter will be termed "signalling." In each frame, of the thirty-two channels designated 0–31 in FIG. 4, thirty are used for speech or data whilst channels 0 and 16 are reserved for signalling. Further information on the use of channels 0 and 16 will be given later.

The superframe start times in the four highways of each concentrator are staggered as shown in FIG. 5 (further explanation will be given later).

The provision of special facilities such as coin fee checking for coin boxes, malicious call alarm, customer private metering, howler and line testing will now be described. These special facilities are provided here by the use of auxiliary signalling units. Two arrangements will be described which may be provided as alternatives or both may be used depending on the facilities required. The first arrangement (FIG. 6) is more suited to the provision of frequently required special facilities to a small number of customers. The second arrangement (FIG. 7) is more suited to the provision of less frequently required special facilities to a large number of customers. Thus, the first arrangement is suitable for coin fee checking, malicious calls and private metering and the second arrangement is suitable for howler and line testing. The function of the auxiliary signalling units is to provide an interface between the p.c.m. systems and equipment providing the special facilities.

FIG. 6 shows a concentrator for providing special facilities by means of auxiliary units (only one such unit is illustrated). A customer's line 10 connected to the concentrator is terminated on a line unit 11 and on an auxiliary unit 12 which is connected to the A switch. Other lines (not shown) requiring a special facility are similarly provided with an auxiliary unit.

The B switch is connected to a signalling unit 13, which in turn is connected to multiplexor 14 (only one of the pcm systems is illustrated). The signalling unit 13 provides an individual circuit for each of the channels of the p.c.m. system to which it is connected.

Channel 16 in each even multiframe is routed by multiplexor 14 and lead 15 to signal logic even 16 which receives similar inputs from each of the three remaining p.c.m. systems of the concentrator. Signal logic even 16 multiplexes channel 16 in even multiframes of all four p.c.m. systems on to a common highway 17 which is connected to the auxiliary signalling unit 12. Signal logic even 16 can be realised in Texas Instruments 7400 series logic.

Signal logic even 16 is also operative to de-multiplex channel 16 in even multiframes in signals from the auxiliary signalling unit 12 on highway 17 to each of the four p.c.m. systems.

Signalling information is gated into and out of the auxiliary signalling unit 12 in accordance with the particular speech or data channel being used by the customer's line to which the auxiliary signalling unit 12 is connected.

Gating of the auxiliary signalling unit 12 is controlled by a pulse indicative of the channel and is transmitted from the signalling unit 13 over an extra wire through the B and A switches to the auxiliary signalling unit 12. Thus, there is a four-wire circuit between the signalling unit 13 and the auxiliary unit 12 through the B and A switching stages. Normally, a three-wire circuit comprising a speech or data pair and a hold wire would be used. A connection between a customer's line and one of the main switching centres 5 (FIG. 1) is established under control of a common control unit (see later) in one of the main switching centres, a connection being established from a group control in the switching centre (see later) via a p.c.m. system to a concentrator, and via multiplexor 14, signalling unit 13, B switch and A switch to the customer's line.

The signalling from and to the p.c.m. systems is multiplexed in signal logic even 16 on to the highway 17 and by means of the concentrator clock (not shown) a pulse is sent over the fourth wire from the signalling unit 13 to gate the signalling into or out of the auxiliary unit concerned. Interfaces included in the signal logic even 16 store the data until it is required and are provided in both the go and return highways. This arrangement allows the use of an asynchronous concentrator clock.

Channel 16 in each odd multiframe is routed via multiplexor 14 and lead 18 to signal logic odd 19 which is connected by lead 20 to the signalling unit 13. Signal logic odd 19 can be realised in Texas Instruments 7400 series logic.

In the second arrangement shown in FIG. 7 a common group of auxiliary units is available for connection to customers' lines.

FIG. 7 shows a line unit 21, A and B switches, a signalling unit 22, a multiplexor 23, signal logic odd 24 and signal logic even 25 connected in a similar manner to the components of FIG. 6.

In FIG. 7 the normal three-wire circuit exists between a customer's line unit 21 and the A switch but a fourth wire is included between all of the A switches and the B switches and between the B switches and the signalling unit 22.

Auxiliary units 27 are terminated on a block of an A switch section in exactly the same manner as customers' lines. A highway 26 is connected to each of the auxiliary units 27.

In operation, a connection between a customer's line and a main switching centre is established in a similar manner to that described in respect of FIG. 6. The connection is made between the customer's line, A and B switching stages, signalling unit 22, multiplexor 23 and a pcm channel.

Assuming that a particular customer has been connected to a main switching centre and a signal has been conveyed that the facility of an auxiliary unit is required, the main switching centre then sets up another connection, via the same B switch as used for the customer connection, and via the same or a different A switch to an auxiliary unit 27 (auxiliary units can be terminated on A switches of separate groups or alternatively intermixed with customer line termination on common groups).

The manner of establishing connections to an auxiliary unit 27 is exactly the same as for establishing a connection to a customer's line.

Once the parallel connections (one to a customer's line and one to an auxiliary unit) are established signalling to the auxiliary unit by means of channel 16 is the same as that already described for an auxiliary unit individually associated with a customer's line.

The respective arrangements described with reference to FIGS. 6 and 7 can be used exclusively or a combination of the two can be employed so that certain customers' lines have individual auxiliary units, while other customers' lines have auxiliary units from a common group selectively associated with them.

FIG. 8 shows the time relationship between superframes in the four pcm systems of a concentrator. In order that a superframe in one system cannot overlap the same designated superframe of another system, the time interval of a superframe occurs between each four superframes, during which time, no scan takes place (see later). This time interval is termed here a 'hiccup' superframe.

FIG. 9 shows the disadvantage resulting from not using a hiccup superframe. As shown in the Figures there is an undesirable overlap between system 0 and system 3.

As explained earlier, each p.c.m. system operating between a Concentrator and a main switching centre consists of 32 channels. Each channel is formed by a time slot containing 8-bit signals, and operating at a sampling rate of 8 KHz, giving an occupation time of 3.9 $\mu$Sec. for each channel, and 125 $\mu$Sec. for the 32 channels, this period being termed a FRAME (F).

Signalling over the p.c.m. system is on a time division multiplex (t.d.m.) basis, the nominal repetition rate being a MULTIFRAME (MF) consisting of 16 FRAMES.

The signalling that is required to take place on a p.c.m. system between a Concentrator and a main switching centre, is of two types, namelyi. customer and concentrator signalling, in which customers' lines are scanned and marked at a slow rate, and ii. channel signalling, in which, once a connection has been established between a customer and a main switching centre, the signalling unit at the Concentrator, signals about the customer at a faster rate during the routing and supervision of the connection.

The 32 channels of a p.c.m. system are designated 0–31, thirty of the channels being used for speech or data, while two, channels 0 and 16 are used for signalling.

Channel 0 in ODD frames is used for the frame synchronisation pattern (sync), which is a 7-bit code, and channel 0 in EVEN frames is used for the customers' and Concentrator control signalling.

Channel 16 is used for MULTIFRAME sync. and channel signalling. Channel 16 in frame FO of both ODD and even multiframes is used for multiframe synchronisation. In frames $F_1$ to $F_{15}$, in ODD multiframes, channel 16 is used for signalling between a main switching centre and a concentrator signalling unit. In frames $F_1$ to $F_{15}$, in EVEN multiframes, channel 16 is used for signalling between a main switching centre and a concentrator auxiliary unit.

In order to provide the necessary signalling requirements, a SUPERFRAME (SF) made up of four MULTIFRAMES (MF0, MF1, MF2, MF3) is employed (see FIG. 5). The signalling arrangement from a main switching centre to a concentrator uses channel 0 in EVEN frames and will now be explained in detail.

The various signalling arrangements are allocated as follows:-

SUPERFRAME SYNCHRONISATION

MFO/FO. This is sent at the start of each SUPERFRAME.

SCAN OR ROUTE INSTRUCTION

MF0/F2. This is a signal sent from a main switching centre, telling a concentrator whether to scan for a new calling condition, or if information is to be routed to a customer.

SECTION ADDRESS

MF0/F4. As with the rest of the addresses, this is produced by using a 'flag' in a particular bit digit position to indicate the address of a SECTION in a Concentrator, e.g. bit 2 being a flag indicating the address of SECTION 2.

BLOCK ADDRESS (each column of a 5×5 crosspoint array in an A switch is termed a block)

MF1/F2, MF1/F4, MF1/F6, MF1/F8, MF1/F10, MF1/F12 and MF1/F14.
MF2/F2, MF2/F4, MF2/F6, MF2/F8, MF2/F10, and MF2/F12.

In this case, a flag in bit 5 or in bit 7, represents a BLOCK address, e.g. MF1/F2, bit 5 signals block zero MF2/F10, but 7 signals block twenty-three

CUSTOMER ADDRESS (each row of a 5×5 cross-point array in an A switch is connected to a respective link to a B switch)

MF0/F6, MF0/F8, MF0/F10, MF0/F12, and MF0/F14.
MF1/F2, MF1/F4, MF1/F6, MF1/F8, MF1/F10, MF1/F12 and MF1/F14.
MF2/F2, MF2/F4, MF2/F6, MF2/F8, MF2/F10, MF2/F12 and MF2/F14.
MF3/F2, MF3/F4, MF3/F6, MF3/F8, MF3/F10 and MF3/F12

The first four bits in each slot are used. The first three bits are used for the customers' signalling, representing Busy, Free and Mark conditions, respectively. The fourth bit is a Mark in the AB Link.

A flag in any one of these positions indicates the particular signal, i.e. a flag in bit 0 represents the message, 'busy the customer'.

An example of a particular signal message will now be given. If customer number ten in BLOCK five of SECTION zero, is to be set to 'busy', the signalling condition will be a flag in particular ones of the bits zero to seven of channel 0 in EVEN frames, as follows i. bit 0 of the SECTION ADDRESS MF0/F4, indicating SECTION 0.
ii. bit 7 of MF1/F6, indicating BLOCK 5.
iii. bit 0 of MF1/F12 indicating 'busy customer A10'.

In the opposite direction, i.e. from Concentrator to main switching centre, a similar arrangement applies, but with certain differences, as under -
i. no SCAN instruction is required,
ii. SECTION ADDRESS is given in the last four bits, 4 to 7 of MF0/F4.

FIG. 10 shows the allocation of channel 0 in even frames over one superframe.

In the first multiframe, MF0, channel 0 has the following contents:
F0 - superframe synchronisation
F2 - scan or route instruction
F4 - section address
F6 - customer address A0
F8 - customer address A1
F10 - customer address A2
F12 - customer address A3
F14 - customer address A4

In the second multiframe, MF1, channel 0 has the following contents:
F0 - information signal γ (see later)
F2 - customer address A5 (first four bits) and block addresses B0 and B1 (last four bits)
F4 - customer address A6 and block addresses B2 and B3
F6 - customer address A7 and block addresses B4 and B5
F8 - customer address A8 and block addresses B6 and B7
F10 - customer address A9 and block addresses B8 and B9
F12 - customer address A10 and block addresses B10 and B11
F14 - customer address A11 and block addresses B12 and B13

In the third multi frame, MF2, channel 0 has the following contents:
F0 - information signal β (see later)
F2 - customer address A12 and block addresses B14 and B15
F4 - customer address A13 and block addresses B16 and B17
F6 - customer address A14 and block addresses B18 and B19
F8 - customer address A15 and block addresses B20 and B21
F10 - customer address A16 and block addresses B22 and B23
F12 - customer address A17 and block address B24
F14 - customer address A18

In the fourth multiframe, MF3, channel 0 has the following contents:
F0 - information signal α (see later)
F2 - customer address A19
F4 - customer address A20
F6 - customer address A21 and signal a (see later)
F8 - customer address A22 and signal b (see later)
F10 - customer address A23 and signal c (see later)
F12 - customer address A24
F14 - not allocated.

A block diagram of a main switching centre 5 is shown in FIG. 11. Each main switching centre includes two group controls, each group control being connected to one highway 4 from each of eight concentrators 1 (FIG. 1). Operation within each main switching centre is under control of a common control 29 and switching takes place in a main switching unit 30. Message handling units 31 provide an interface between the group controls 28 and the common control 29. A control link 32 is provided between the common controls of one and the other main switching centres. If a switching centre is unable to effect a required connection, instructions can be passed over this link to cause the other switching centre to attempt the connection. The switching unit 30 is of the type described in U.S. Pat. Specification No. 3,878,338.

A block diagram of a group control is shown in FIG. 12. Each highway 4 is terminated in the group control on a respective system logic 33. The speech (or data) outputs of the highways (thirty of the thirty-two channels in each frame) are brought out to the main switching unit on leads 34 (only one lead is illustrated).

Channel 16 from each highway 4 is multiplexed on line 35 as input to a time shared logic unit 36, while channel 0 from each highway 4 is multiplexed on line 37 as input to another time shared logic unit 38. Logic unit 36 comprises units 39 and 40 and logic unit 38 comprises units 41 and 42. Units 41 and 42 serve the multiplexed channel 0's for processing the customers' signalling and units 39 and 40 serve the multiplexed channel 16's for processing the channel signalling. Information relating to the states of channels, free or busy, is passed between the two units 39 and 41 by lead 43. Units 39 and 41 are common logic units and units 40 and 42 are 256-word and 8-word cyclic stores respectively. Stores 40 and 42 are connected by leads 44 and 45 respectively to respective message handling units 31. Texas Instruments 7400 series logic is suitable for the logic circuitry of FIG. 12.

Cyclic store 40, for channel 16, and cyclic store 42, for channel 0, provide storage for recording the previous history of each of the multiplexed channels. The instantaneous signalling is presented to the common logic 39, for channel 16, and to common logic 41, for channel 0, which make a decision and either rewrite the cyclic store, or simply recycle it.

In order to achieve reliability and security of operation of a concentrator, it is necessary for the two group controls in a main switching centre to be as independent of each other as possible, but at the same time each of the group controls within a main switching centre must at any instant in time be concerned with what is happening in the other three group controls. Successful interworking between the four group controls and any particular concentrator is achieved by having the superframe start times for the four pcm systems of the concentrator staggered by sixteen frames. This avoids the possibility of double connections caused by two or more group controls trying to set up connections for the same call.

This staggering is achieved by sending information regarding the relative position of the SUPERFRAME starts of the systems back to the Group Control in MF1/F0, MF2/F0 and MF3/F0, and here designated $\alpha$, $\beta$ and $\gamma$ respectively (see FIG. 10).

As previously stated, for the purpose of this example, a Concentrator is formed by four SECTIONS.

In order to prevent a SECTION being simultaneously addressed by more than one Group Control, it is arranged that the systems scan through the SECTIONS in an orderly sequence as shown in FIG. 8. The 'hiccup' SUPERFRAME (H) occurs between each group of four SECTIONS, during which time no scan operation takes place. FIG. 9 shows the arrangement without the 'hiccup' SUPERFRAME, and it will be seen that, for example, at the time T, SECTION 0 is being addressed by System 0 and by system 3, that is, being addressed by both at the same time.

The use of the 'hiccup' SUPERFRAME prevents this.

The arrangement shown in FIG. 8 keeps the systems spaced correctly provided no system is holding a SECTION for more than one SUPERFRAME. When information is to be routed to a customer however, a system needs to address a SECTION for more than one SUPERFRAME, and without additional information this will lead to two systems addressing the same SECTION. In order to prevent this, bits 4–7 of MF3/F6, MF3/F8 and MF3/F10 are used to carry appropriate information.

This information is 'up-to-date' because it is taken after the last SECTION address, and each of the slots is used to indicate the SECTION being addressed by a system. The Group Control is thus told if the SECTION it wishes to address is occupied or not. Returning the information to the Group Control in this way has the advantage that since it is told if it can address a SECTION, it does not try to do this unless it is possible. This means a saving in the Concentrator, in that it is not necessary to provide inhibition to prevent a SECTION being scanned by more than one system.

As explained each concentrator is connected to two main switching centres, the four p.c.m. systems being divided so that two systems go to a first main switching centre and two to a second main switching centre, as shown in FIG. 1. Each p.c.m. system of a concentrator terminates on a respective group control of a main switching centre.

Each group control serves eight different concentrators.

The signalling format employed on the p.c.m. systems between a concentrator and the group controls of a main switching centre, has already been described, and a basic superframe of 64 frames is employed. Successful interworking between four group controls and a concentrator is achieved, as explained, by staggering the superframe start times for the four p.c.m. systems. In F0 of MF0 is the superframe synchronisation for the system under consideration, while in F0 MF1, F0 MF2 and F0 MF3 there is signalling information, designated $\gamma$, $\beta$ and $\alpha$ respectively, relating to the relative superframe timings of the other three p.c.m. systems serving that concentrator. The signalling information in each case, is a 6-bit binary number identifying which frame of the 64 frames constituting a superframe, the other systems have reached at the time of the superframe synchronisation of the system under consideration.

Consider now one of the four group controls terminating eight p.c.m. systems, each from a different concentrator. A circuit arrangement in order to achieve alignment of the eight systems within the group control, and also to ensure that the group control knows what the other three group controls are doing at any instant in time, is shown in FIG. 13.

The 6-bit binary number signalling information in channel 0 of EVEN frames of the eight p.c.m. systems incoming to the group control, and designated $\gamma$, $\beta$ and $\alpha$ in respect of the other three systems in each case is multiplexed in the group control on to a signal highway 46. The superframe timings of the other three systems for each of the eight systems, are gated in turn into separate locations in a CYCLIC STORE 47, each system having a word of storage, i.e. 18 bits available.

Each of the eight systems incoming to a group control is processed in turn.

After the superframe timings $\gamma$, $\beta$ and $\alpha$ for one concentrator have been stored in CYCLIC STORE 47, each 6-bit storage is transferred to an individual ADDER CIRCUIT, that of $\gamma$ to ADDER 48, $\beta$ to ADDER 49, and $\alpha$ to ADDER 50.

Since the four group controls have their relative superframe timings staggered by 16 frames, the circuits 48, 49 and 50, add the binary numbers for the amounts 48, 32 and 16 respectively, to the number representing the superframe start time transferred from the CYCLIC STORE 47. If the superframe start times are correct, the resultant sums in each of the ADDERS 48, 49 and 50 should be the binary number for 64. The sum outputs of the ADDERS 48, 49 and 50 are compared in pairs in COMPARATORS 51, 52 and 53, and the three outputs of these are applied as inputs to a LOGIC CIR- CUIT 54 the output of which is used to preset a 6-bit BINARY COUNTER comprising CYCLIC STORE 55 and ADDER 56. The output of the STORE 55 is used to bring the superframe start time of the system connected to the group control into alignment with the other three systems of that concentrator. Texas Instruments 7400 series logic can be used for the circuitry of FIG. 13.

It will be appreciated that each of the four group controls operates a circuit arrangement as shown in FIG. 13. In order to prevent simultaneous control operation of superframe timing in the group controls, it is arranged that the operation in each group control takes place during a specified T pulse period, a different period being allocated for each group control.

From the foregoing it may be seen that it is possible for the eight different concentrators served by a group control to have different superframe timings, although for a particular concentrator its four group controls will be aligned correctly.

Further to the synchronisation of the group controls as described relative to FIG. 13, it is also necessary to ensure that a particular SECTION of a concentrator is not addressed by more than one group control at a time. The group controls look in turn at each of the four SECTIONS of a concentrator, one SECTION in each superframe, and then suffer an enforced idle period, this being known as the 'hiccup' method. In this way the 'customers' lines in a concentrator may be scanned by each group control in turn. In order to do this the SECTION address must be generated correctly by a group control, and a circuit for accomplishing this is shown in FIG. 14.

A concentrator sends to the group control of each of its four systems, the addresses of its SECTIONS that are being accessed, in each case by the other three group controls. These addresses are sent at the end of a superframe period, the 4-bit addresses being given in F6, F8 and F10 of MF3 (see FIG. 10) and will be termed here $a$, $b$ and $c$ respectively.

With reference to FIG. 14, the 4-bit binary number signalling information of each of the $a$, $b$ and $c$ SECTION addresses is multiplexed in the group control onto a signalling highway 57. The three addresses $a$, $b$ and $c$ are gated in turn into REGISTERS 58, 59 and 60 respectively.

Since a group control is only allowed to begin addressing a SECTION at a particular time (F4 MF0) any changes in a SECTION address can only occur at that time. The outputs of the REGISTERS 58, 59 and 60 are applied to COMPARE circuits 61, 62 and 63, and also to 12-bit CYCLIC STORE 64, which has an output to each of the COMPARE circuits 61, 62 and 63. In these COMPARE circuits the addresses received by REGISTERS 58, 59 and 60 are compared with the previous addresses held in the CYCLIC STORE 64. The output of the COMPARE circuits 61, 62 and 63 are applied to a LOGIC circuit 65, which deduces which SECTION should in fact be addressed, and writes an entry in a 4-bit CYCLIC STORE 66 accordingly, the SECTION being indicated on the STORE output.

The SECTION address in the 4-bit CYCLIC STORE 66 is incremented every superframe by an ADDER 67. On the fifth count the all zeros state is used to indicate the idle 'hiccup' period, of a SECTION:

Texas Instruments 7400 series logic can be used for the circuitry of FIG. 14.

The cyclic stores employed in FIGS. 13 and 14 can for example, be drum types of stores or shift registers.

Whilst particular embodiments of the invention have been described, it will be understood that other forms and variations are possible.

For example, the use of two main switching centres having two group controls each has been described and whilst this arrangement provides a measure of security in the event of a breakdown it is, however, possible to use only one main switching centre comprising four group controls.

If only one main switching centre is used, it will be apparent that all the pcm highways 4 shown in FIG. 1 should terminate in the one main switching centre. There would be a single common control without the control link 32 of FIG. 11.

It should be understood that the numbers of component parts (for example, the number of concentrators and group controls) of the system is given by way of example only. In practice, of course, the system would be adapted to provide the service required to fulfil the need outstanding.

For example, each group control has been shown as serving eight different concentrators but some (or all) of the group controls could serve fewer or more than eight concentrators. The interconnection of concentrators and group controls can likewise be arranged as occasion demands, for example, it is not necessary, but it is desirable for security that each concentrator highway should be connected to a different group control.

The actual signalling format described is for explanatory purposes only. It will be evident that other arrangements are possible, and that the data location for various functions are open to change.

We claim:
1. A digital switching system comprising:
a multiplicity of data terminals,
a concentrator having a multiplicity of inputs each connected to a respective one of said data terminals, a switching network connected from said inputs to a time division multiplex pulse code modulation (pcm) multiplexor, and control logic means connected to said switching network and said multiplexor,
a first pcm highway connected at one end to said multiplexor,
a first switching center including concentrator control means connected to the other end of said first pcm highway adapted to send to said control logic means of said concentrator a signal instructing the concentrator to connect one data terminal to a particular pcm channel on said first highway, and to connect another data terminal to another particular pcm channel on said first highway, switching means adapted to interconnect the particular pcm channels on said first highway to thereby interconnect the two data terminals, and switching center control means connected to said concentrator control means and said switching means,
a second pcm highway connected at one end to said multiplexor,
a second switching center including concentrator control means connected to the other end of said second pcm highway adapted to send to said control logic means of said concentrator a signal instructing the concentrator to connect one data terminal to a particular pcm channel on said second highway, and to connect another data terminal to another particular pcm channel on said second highway, switching means adapted to interconnect the particular pcm channels on said second highway to thereby interconnect the two data terminals, and switching center control means connected to said concentrator control means and said switching means, control link means connected from said switching center control means of said first switching center to said switching center control means of said second switching center, said switching center control means of said first and second switching centers being adapted to pass instructions over said control link means to cause the other switching center to attempt a connection of said particular pcm channels if one of said switching centers is unable to effect a required connection, and said concentrator control means in said first and second switching centers including means to avoid the possibility of the same connection being set up on both said first and second pcm highways simultaneously.

2. A digital switching system as set forth in claim 1, wherein said means to avoid the possibility of the same connection being set up on both said first and second highways comprises means to stagger the pcm timing on said first and second highways.

3. A digital switching system as set forth in claim 1, wherein said data terminals are telephone instruments connected to said concentrator by telephone lines, each input of said concentrator is connected to a respective one of a plurality of line units adapted to detect the loop or calling condition, a signalling unit is connected from said switching network to said multiplexor, a plurality of supervisory service, such as coin fee checking, units are each connected from a respective one of a selected number of said inputs to said switching network to provide a supervisory service frequently necessary for a small number of customers and are adapted to be controlled from said switching centers, and signal logic means is connected to said multiplexor and said supervisory service units and is adapted to route instructions from said switching centers to said supervisory service units.

4. A digital switching system as set forth in claim 3, wherein said signalling unit includes means to send pulses to said supervisory service units over extra wires provided in said switching network to gate the supervisory service signalling, and said signal logic means includes interface means to store data until it is required.

5. A digital switching system as set forth in claim 1, wherein said data terminals are telephone instruments connected to said concentrator by telephone lines, each input of said concentrator is connected to a respective one of a plurality of line units adapted to detect the loop or calling condition, a signalling unit is connected from said switching network to said multiplexor, a plurality of supervisory service, such as howler, units are each connected to a respective input of said switching network to provide a supervisory service infrequently necessary for a large number of customers and are adapted to be controlled from said switching centers, and signal logic means is connected to said multiplexor and said supervisory service units and is adapted to route instructions from said switching centers to said supervisory service units.

6. A digital switching system as set forth in claim 5, wherein said signalling unit includes means to send pulses to said supervisory service units over extra wires provided in said switching network to gate the supervisory service signalling, and said signal logic means includes inter-face means to store data until it is required.

7. A digital switching system comprising:
a plurality of concentrators, each concentrator having: a multiplicity of inputs each connected to a respective data terminal, a switching network connected from said inputs to a time division multiplex pulse code modulation (pcm) multiplexor, and control logic means connected to said switching network and said multiplexor, a first switching center including concentrator control means connected to the multiplexor of each of said concentrators by a separate first pcm highway from each concentrator, said concentrator control means being adapted to send to the control logic means of any one of said plurality of concentrators a signal instructing that concentrator to connect one data terminal to a particular pcm channel on its first highway, and to connect another data terminal to another particular pcm channel on its first highway, switching means adapted to interconnect the particular pcm channels on said first highway to thereby interconnect the two data terminals, and switching center control means connected to said concentrator control means and said switching means, a second switching center including concentrator control means connected to the multiplexor of each of said concentrators by a separate second pcm highway from each concentrator, said concentrator control means being adapted to send to the control logic means of any one of said plurality of concentrators a signal instructing that concentrator to connect one data terminal to a particular pcm channel on its second highway, and to connect another data terminal to another particular pcm channel on its second highway, switching means adapted to interconnect the particular pcm channels on said second highway to thereby interconnect the two data terminals, and switching center control means connected to said concentrator control means and said switching means, control link means connected from said switching center control means of said first switching center to said switching center control means of said second switching center, said switching center control means of said first and second switching centers being adapted to pass instructions over said control link means to cause the other switching center to attempt a connection of said particular pcm channels if one of said switching centers is unable to effect a required connection, and means connected in said concentrator control means of said first and second switching centers to avoid the possibility of the same connection being set up on two of said pcm highways simultaneously.

8. A digital switching system as set forth in claim 7, wherein said first switching center includes a second concentrator control means additional to its first-mentioned control means, said second concentrator control means of the first switching center being connected to a separate third pcm highway from each concentrator, and wherein said second switching center includes a second concentrator control means additional to its second-mentioned control means, said second concentrator control means of the second switching center being connected to a separate fourth pcm highway from each concentrator.

* * * * *